United States Patent
D'Aluisio et al.

(10) Patent No.: US 9,242,691 B2
(45) Date of Patent: Jan. 26, 2016

(54) BICYCLE WITH AERODYNAMIC UPPER HEAD TUBE

(71) Applicant: Specialized Bicycle Components, Inc., Morgan Hill, CA (US)

(72) Inventors: Christopher P. D'Aluisio, Corralitos, CA (US); Christopher Yu, Mountain View, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 0 days.

(21) Appl. No.: 14/189,599

(22) Filed: Feb. 25, 2014

(65) Prior Publication Data

US 2014/0265228 A1  Sep. 18, 2014

Related U.S. Application Data

(60) Provisional application No. 61/789,151, filed on Mar. 15, 2013.

(51) Int. Cl.
| | | |
|---|---|---|
| *B62K 19/32* | (2006.01) | |
| *B62K 3/02* | (2006.01) | |
| *B62K 19/00* | (2006.01) | |
| *B62K 21/06* | (2006.01) | |

(52) U.S. Cl.
CPC ............... *B62K 19/00* (2013.01); *B62K 19/32* (2013.01); *B62K 21/06* (2013.01)

(58) Field of Classification Search
CPC .................................. B62K 3/02; B62K 19/32
USPC ............... 280/279, 281.1; D12/110, 111, 117
See application file for complete search history.

(56) References Cited

U.S. PATENT DOCUMENTS

| | | | | |
|---|---|---|---|---|
| 2,504,452 | A * | 4/1950 | Rostan | 180/219 |
| 3,079,173 | A * | 2/1963 | Hedstrom | 280/279 |
| 3,233,916 | A * | 2/1966 | Bowden | 280/274 |
| D208,790 | S * | 10/1967 | Reeves | D12/113 |
| 4,462,606 | A * | 7/1984 | Hon | 280/278 |
| 5,275,067 | A | 1/1994 | Lew | |
| 5,517,878 | A * | 5/1996 | Klein et al. | 74/551.3 |
| 5,803,476 | A | 9/1998 | Olson et al. | |
| 6,789,814 | B1 * | 9/2004 | Bouloy | 280/281.1 |
| 6,848,700 | B1 | 2/2005 | Fritschen | |
| D510,059 | S * | 9/2005 | Hickman | D12/117 |
| D519,885 | S * | 5/2006 | Thompson | D12/111 |
| 7,503,575 | B2 * | 3/2009 | Kurokawa et al. | 280/279 |
| 7,506,528 | B2 * | 3/2009 | Chamberlain | 72/370.01 |
| 7,837,211 | B2 * | 11/2010 | Falke et al. | 280/280 |

(Continued)

*Primary Examiner* — Joseph Rocca
*Assistant Examiner* — Daniel Yeagley
(74) *Attorney, Agent, or Firm* — Michael Best & Friedrich LLP (57) ABSTRACT

The present invention provides a bicycle comprising front and rear wheels and a frame including a main frame having a head tube and a top tube secured to the head tube at an intersection spaced from an upper end of the head tube. The intersection has a first lateral width, and the head tube above the intersection includes a tapered portion that tapers to a second lateral width narrower than the first lateral width. For example, the first lateral width can be at least three percent wider than the second lateral width. In one embodiment, the head tube above the tapered portion includes a flared portion that flares to a third lateral width wider (e.g., at least ten percent wider) than the second lateral width. In addition, the tapered portion can include a length that is larger (e.g., at least one hundred percent larger) than the second lateral width.

19 Claims, 6 Drawing Sheets

(56) References Cited

U.S. PATENT DOCUMENTS

| | | | |
|---|---|---|---|
| 8,641,071 B2* | 2/2014 | D'Aluisio et al. | 280/281.1 |
| 8,696,007 B2* | 4/2014 | Jankura et al. | 280/281.1 |
| 8,746,389 B2* | 6/2014 | Oe et al. | 180/219 |
| 2003/0038449 A1* | 2/2003 | Gueugneaud | 280/279 |
| 2006/0273542 A1 | 12/2006 | Chamberlain | |
| 2006/0284394 A1 | 12/2006 | Chamberlain et al. | |
| 2007/0134456 A1 | 6/2007 | Fritschen | |
| 2008/0054594 A1 | 3/2008 | Irizar | |
| 2008/0238026 A1* | 10/2008 | Callahan et al. | 280/281.1 |
| 2010/0199801 A1 | 8/2010 | Huang | |
| 2011/0278816 A1 | 11/2011 | Chamberlain | |
| 2012/0274041 A1 | 11/2012 | Nicol | |

* cited by examiner

BICYCLE WITH AERODYNAMIC UPPER HEAD TUBE

CROSS-REFERENCE TO RELATED APPLICATIONS

This application claims priority to U.S. Provisional Patent Application No. 61/789,151 filed on Mar. 15, 2013, the entire contents of which are incorporated herein by reference.

BACKGROUND

The present invention relates generally to the field of bicycles and specifically to bicycle frames.

Most bicycles include two wheels supporting a frame having a main frame and a front fork pivotally coupled to a head tube of the main frame. The main frame commonly also includes a top tube extending rearward from an upper end of the head tube, a seat tube extending downward from a rear end of the top tube, and a down tube connecting a lower end of the seat tube with a lower end of the head tube.

Aerodynamics can be a very important part of a bicycle, especially racing bicycles. Any improvement to the aerodynamics of a bicycle is considered desirable.

SUMMARY

The present invention provides a bicycle comprising front and rear wheels and a frame supported by the wheels. The frame includes a main frame having a head tube and a top tube secured to the head tube at an intersection spaced from an upper end of the head tube. The intersection has a first lateral width, and the head tube above the intersection includes a tapered portion that tapers to a second lateral width narrower than the first lateral width. For example, the first lateral width can be at least three percent, and preferably at least five percent, wider than the second lateral width.

In one embodiment, the head tube above the tapered portion includes a flared portion that flares to a third lateral width wider than the second lateral width. For example, the third lateral width can be at least ten percent (preferably at least twenty percent, and more preferably at least twenty-five percent) wider than the second lateral width. In addition, the tapered portion can include a length that is larger than the second lateral width. Preferably, the length is at least one hundred percent (preferably at least one hundred fifty percent, and more preferably at least one hundred eighty percent) larger than the second lateral width.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
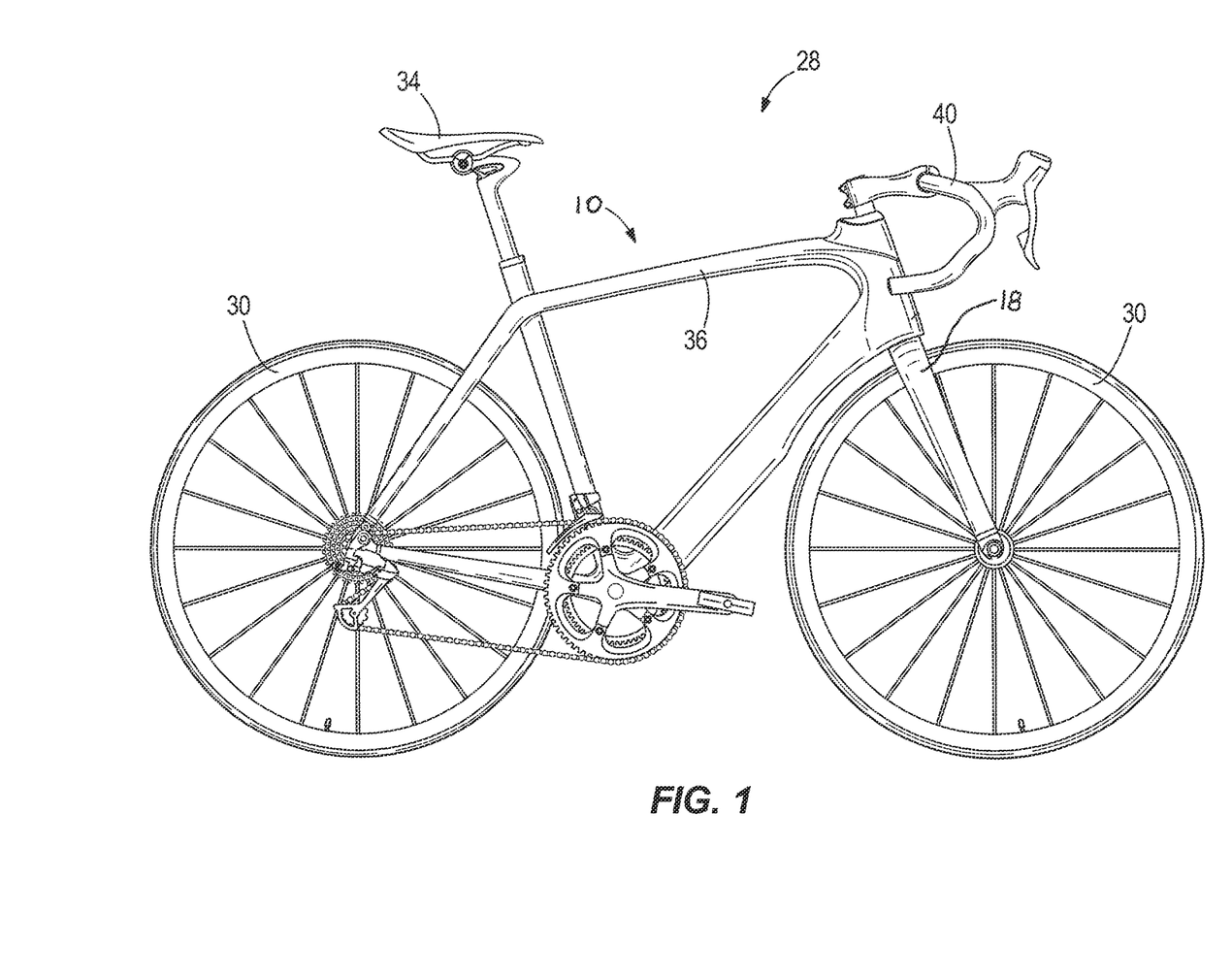
FIG. 1 is a side view of a bicycle having a bicycle frame embodying the present invention.
Figure 2:
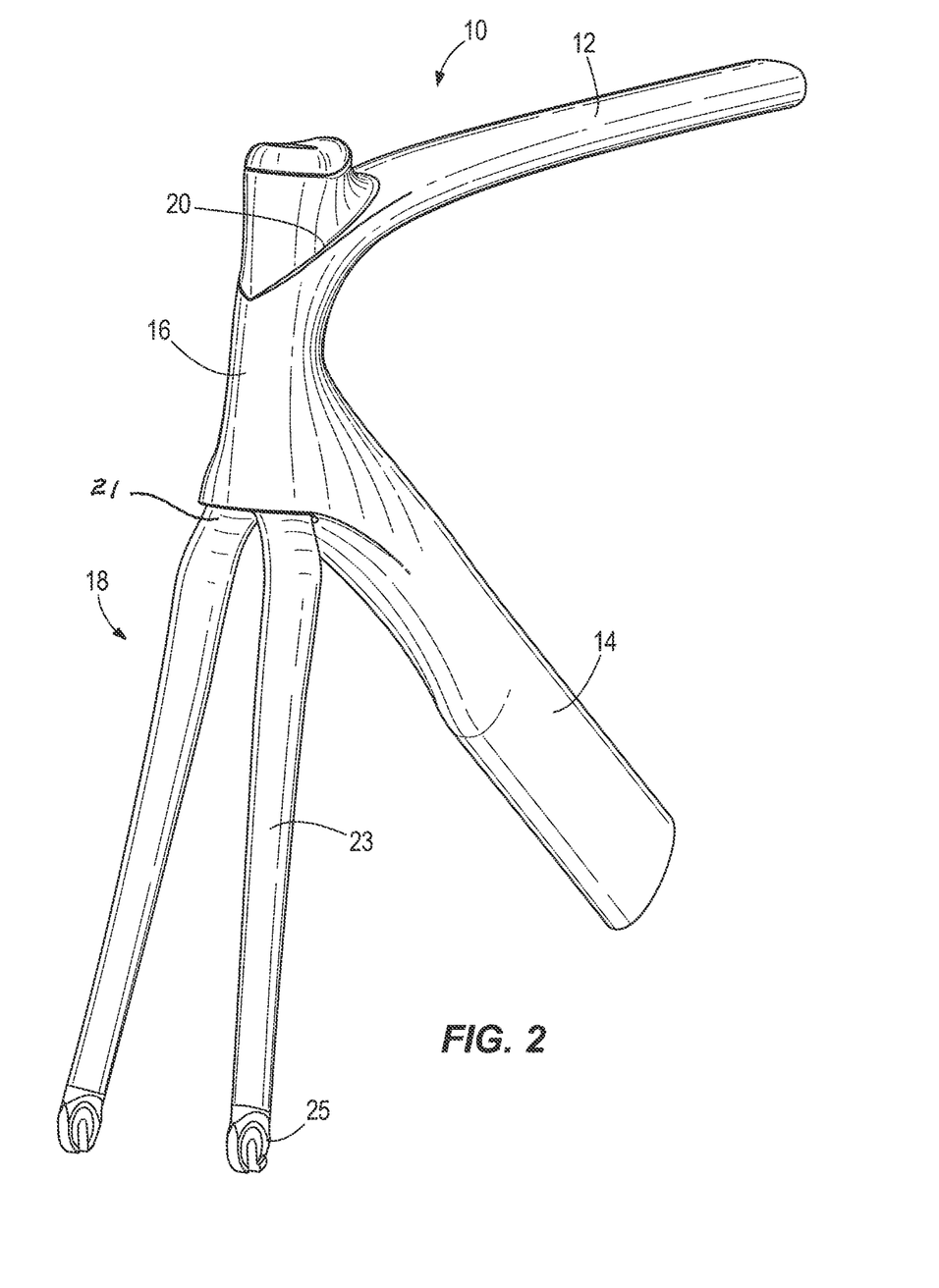
FIG. 2 is perspective view of a front portion of the bicycle frame of FIG. 1.
Figure 3:
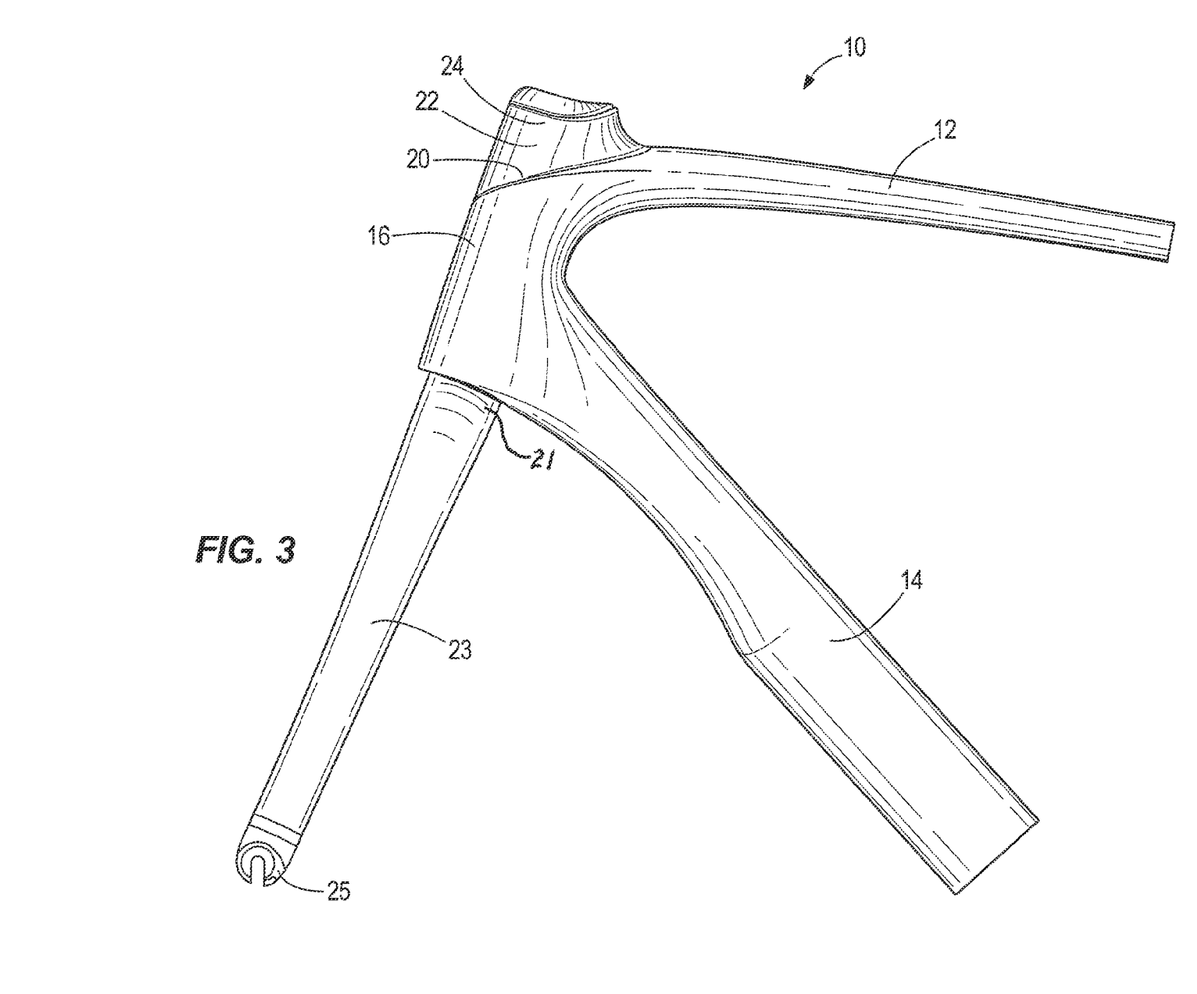
FIG. 3 is a side view of the front portion of the bicycle frame of FIG. 1.
Figure 4:
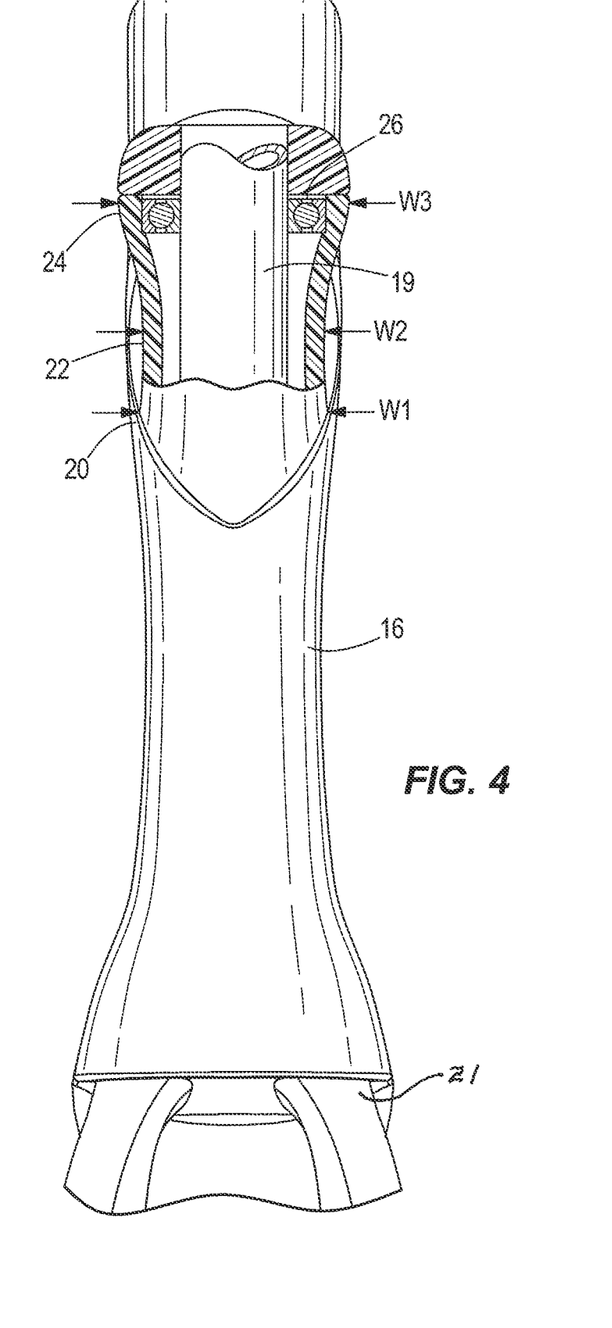
FIG. 4 is a front view of the front portion of the bicycle frame of FIG. 1 in partial section.
Figure 5:
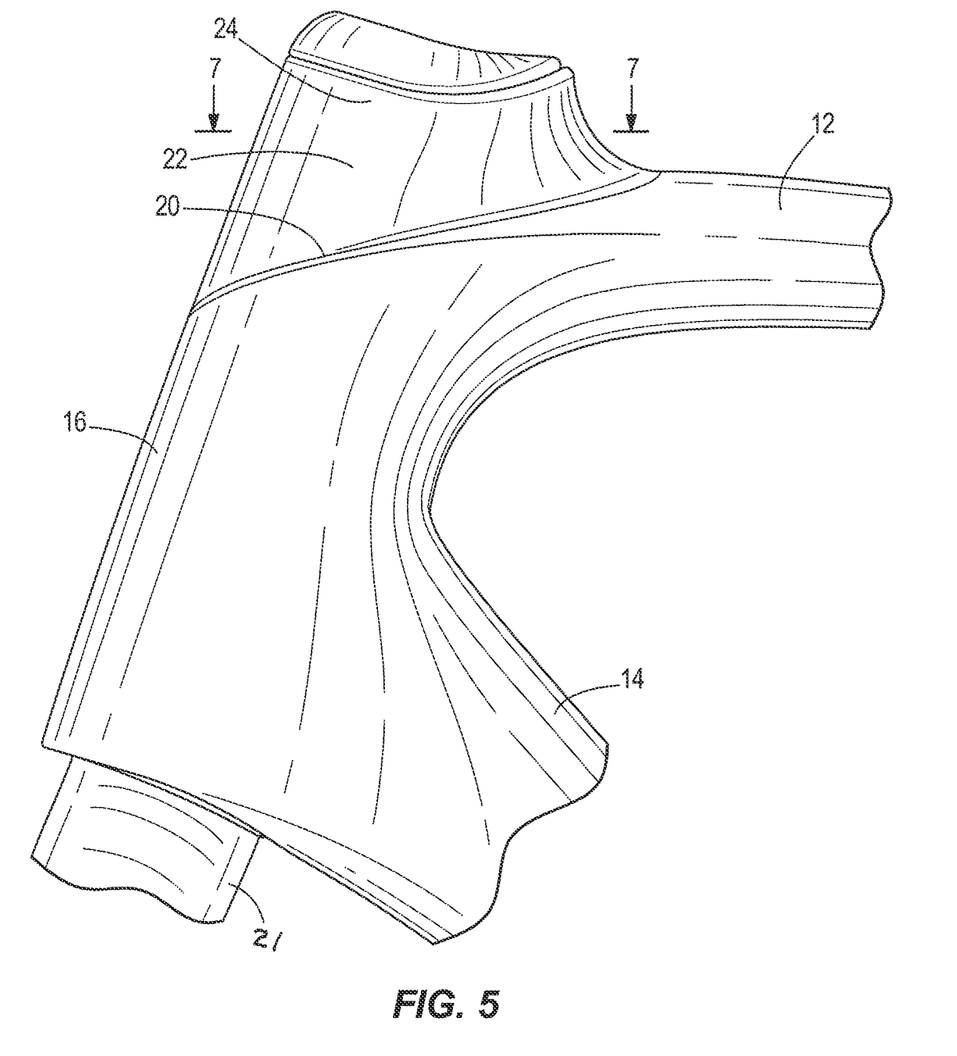
FIG. 5 is an enlarged side view of the front portion of the frame in FIG. 1.
Figure 6:
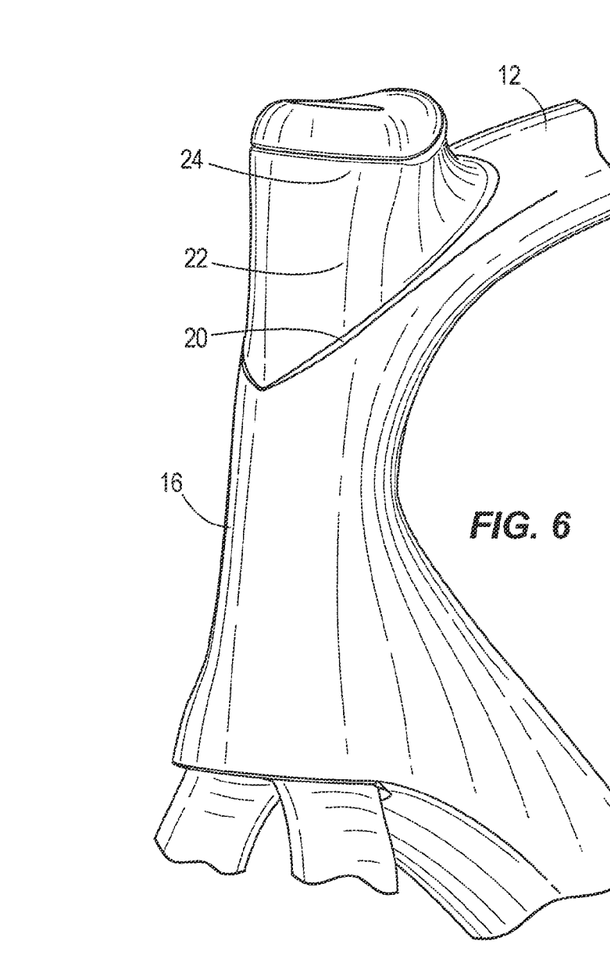
FIG. 6 is an enlarged perspective view of the front portion of the frame in FIG. 1.

FIG. 1 illustrates a bicycle 28 including front and rear wheels 30, a frame 10 supported by the wheels 30, and a seat 34. The frame 10 includes a main frame 36 and a fork 18 rotationally coupled to the main frame 36. Handlebars 40 are secured to the fork to facilitate steering the bicycle. The frame 10 includes a top tube 12, down tube 14, and a head tube 16 supporting the front fork 18. The fork 18 includes a steerer tube 19, a fork crown 21, fork blades 23, and fork tips 25. The top tube 12 is secure to the head tube 16 at an intersection 20 spaced from an upper end of the head tube 16. Referring to FIG. 4, the intersection 20 has a first lateral width W1 that is relatively wide.

Figure 7:
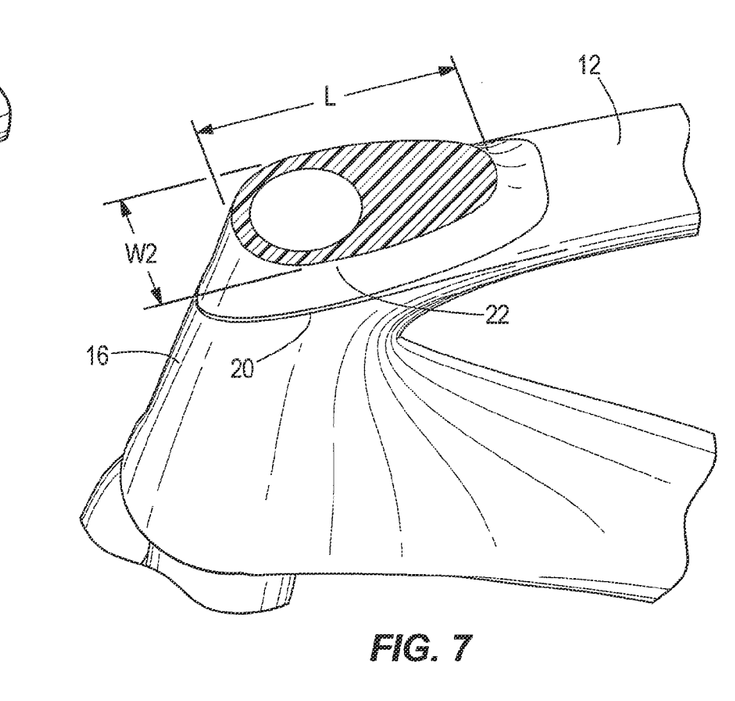
FIG. 7 is a substantially horizontal section view taken along line 7-7 in FIG. 5.

Above the intersection 20, the head tube 16 includes a tapered portion 22 that tapers to a second lateral width W2 that is narrower than the first lateral width W1. The tapered portion 22 includes a length L that is larger than the second lateral width W2 to thereby enhance the aerodynamics of the bicycle. At its narrowest horizontal section (FIG. 7), the tapered portion 22 has a width W2 of about 35 mm and a length L of about 100 mm. In contrast, the intersection 20 has a width W1 of about 37 mm.

Above the tapered portion 22, the head tube 16 includes a flared portion 24 that flares to a third lateral width W3 wider than the second lateral width W2. The upper end of the flared portion 24 is dimensioned to receive an upper head tube bearing 26. The flared portion 24 has a width W3 of about 45 mm.

Various features of the invention are set forth in the following claims.

The invention claimed is:
1. A bicycle comprising:
front and rear wheels; and
a longitudinal frame supported at each end by the wheels, the frame including a main frame having a head tube and a top tube, wherein the top tube is secured to the head tube at an intersection spaced from an upper end of the head tube,
the intersection having a first lateral width perpendicular to the longitudinal frame, and
the head tube above the intersection including a tapered portion that tapers upward to a second lateral width narrower than the first lateral width, and
the head tube above the tapered portion including a flared portion that flares upward to a third lateral width wider than the second lateral width,
wherein a horizontal cross-section taken through the tapered portion has an oblong shape perpendicular to the second lateral width, and
wherein a horizontal cross-section taken through the flared portion has an oblong shape perpendicular to the third lateral width,
wherein the tapered portion and the flared portion define an external surface of the frame.

2. The bicycle of claim 1, wherein the tapered portion includes a horizontal cross-sectional length that is larger than the second lateral width.

3. The bicycle of claim 1, wherein the third lateral width is wider than the first lateral width.

4. The bicycle of claim 3, wherein the third lateral width is at least ten percent wider than the second lateral width.

5. The bicycle of claim 3, wherein the third lateral width is at least twenty percent wider than the second lateral width.

6. The bicycle of claim 3, wherein the third lateral width is at least twenty-five percent wider than the second lateral width.

7. The bicycle of claim 1, wherein the first lateral width is at least three percent wider than the second lateral width.

8. The bicycle of claim 1, wherein the first lateral width is at least five percent wider than the second lateral width.

9. The bicycle of claim 1, wherein the tapered portion has a horizontal cross-sectional length that is at least one hundred percent larger than the second lateral width.

10. The bicycle of claim 1, wherein the tapered portion has a horizontal cross-sectional length that is at least one hundred fifty percent larger than the second lateral width.

11. The bicycle of claim 1, wherein the tapered portion has a horizontal cross-sectional length that is at least one hundred eighty percent larger than the second lateral width.

12. A bicycle comprising:
    front and rear wheels; and
    a longitudinal frame supported at each end by the wheels, the frame including a main frame having a head tube and a top tube, wherein the top tube is secured to the head tube at an intersection spaced from an upper end of the head tube,
    the intersection having a first lateral width perpendicular to the longitudinal frame, and the head tube above the intersection including a tapered portion that tapers upward and inwardly to a second lateral width,
    wherein the head tube above the tapered portion includes a flared portion that flares upward to a third lateral width wider than the second lateral width, and
    wherein the head tube above the intersection has a horizontal cross-sectional length at the tapered portion perpendicular to the second lateral width that is larger than the second lateral width,
    wherein the tapered portion and the flared portion define an external surface of the frame.

13. The bicycle of claim 12, wherein the third lateral width is wider than the first lateral width.

14. The bicycle of claim 12, wherein the third lateral width is at least ten percent wider than the second lateral width.

15. The bicycle of claim 12, wherein the third lateral width is at least twenty percent wider than the second lateral width.

16. The bicycle of claim 12, wherein the third lateral width is at least twenty-five percent wider than the second lateral width.

17. The bicycle of claim 12, wherein the first lateral width is at least three percent wider than the second lateral width.

18. The bicycle of claim 12, wherein the first lateral width is at least five percent wider than the second lateral width.

19. The bicycle of claim 12, wherein the cross-sectional length at the tapered portion is at least one hundred percent larger than the second lateral width.

* * * * *

UNITED STATES PATENT AND TRADEMARK OFFICE
CERTIFICATE OF CORRECTION

PATENT NO. : 9,242,691 B2  
APPLICATION NO. : 14/189599  
DATED : January 26, 2016  
INVENTOR(S) : Christopher P. D'Aluisio, Christopher Yu and Jean-Luc Callahan Page 1 of 1

It is certified that error appears in the above-identified patent and that said Letters Patent is hereby corrected as shown below:

Title Page

Item (72): add Inventor --Callahan, Jean-Luc, Morgan Hill, CA--

Signed and Sealed this  
Tenth Day of May, 2016

Michelle K. Lee  
*Director of the United States Patent and Trademark Office*